(No Model.)　　　　　　　　　　　　　　　　　5 Sheets—Sheet 1.
M. G. BUNNELL.
MACHINE FOR MAKING AND REPAIRING ROADS.
No. 448,708.　　　　　　　　　　Patented Mar. 24, 1891.
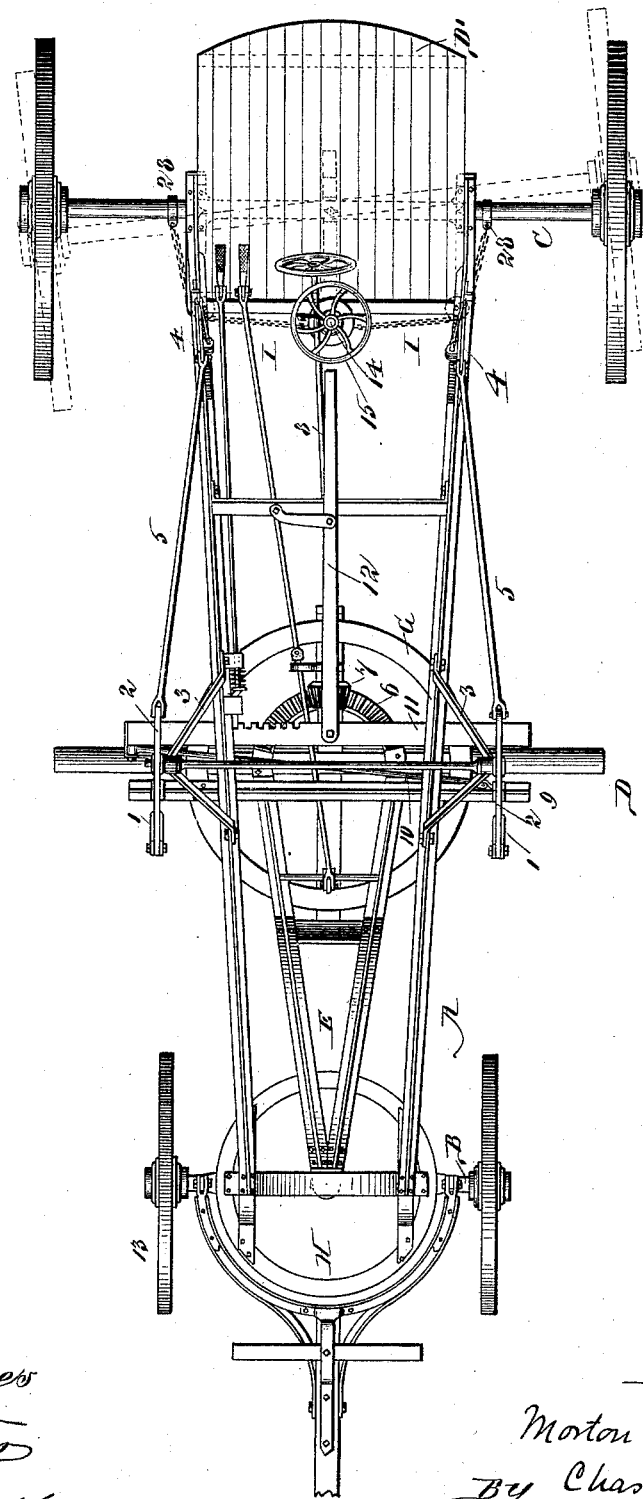

(No Model.) 5 Sheets—Sheet 2.
M. G. BUNNELL.
MACHINE FOR MAKING AND REPAIRING ROADS.
No. 448,708. Patented Mar. 24, 1891.
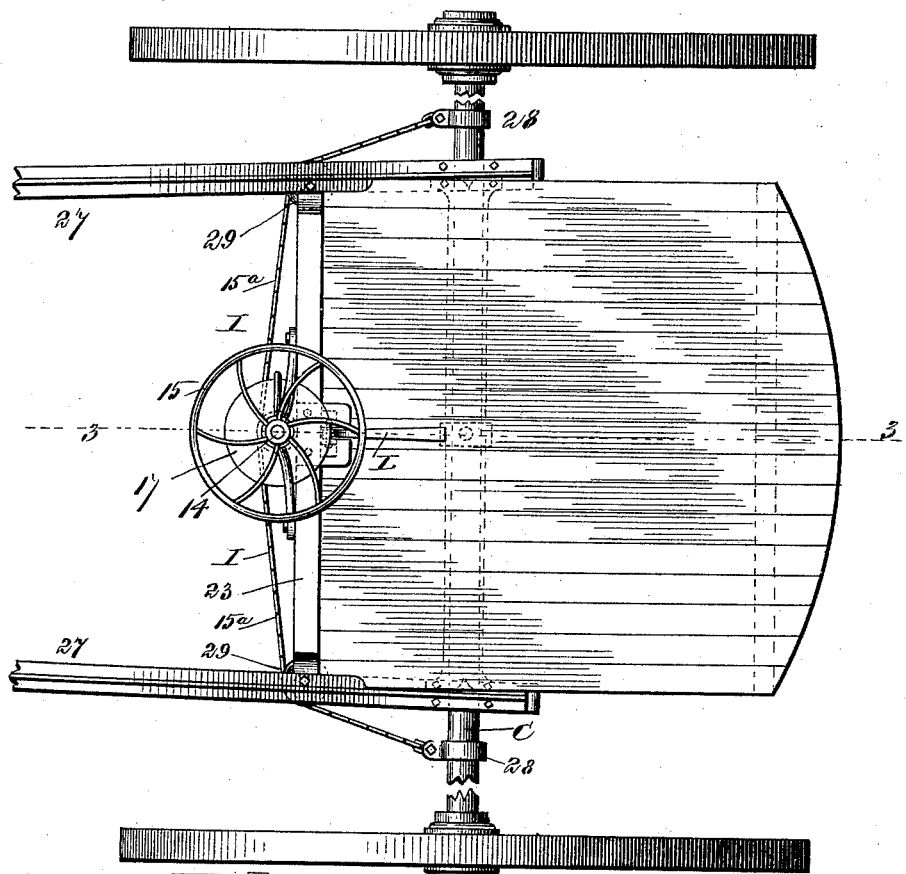
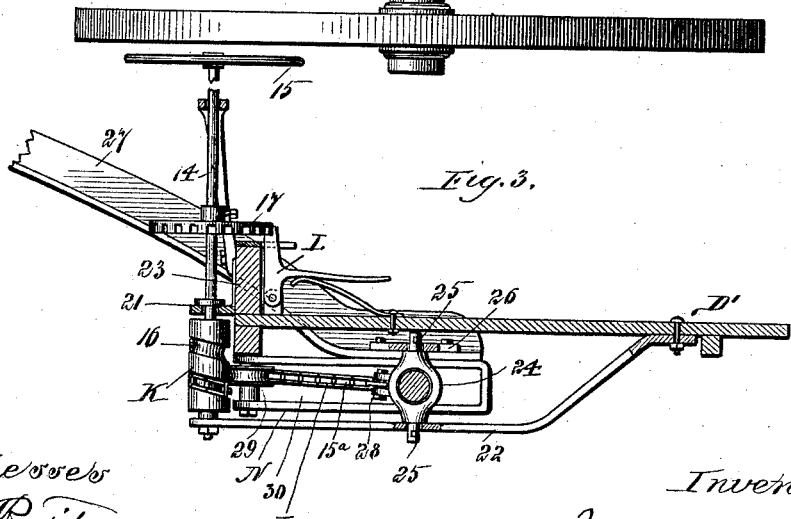

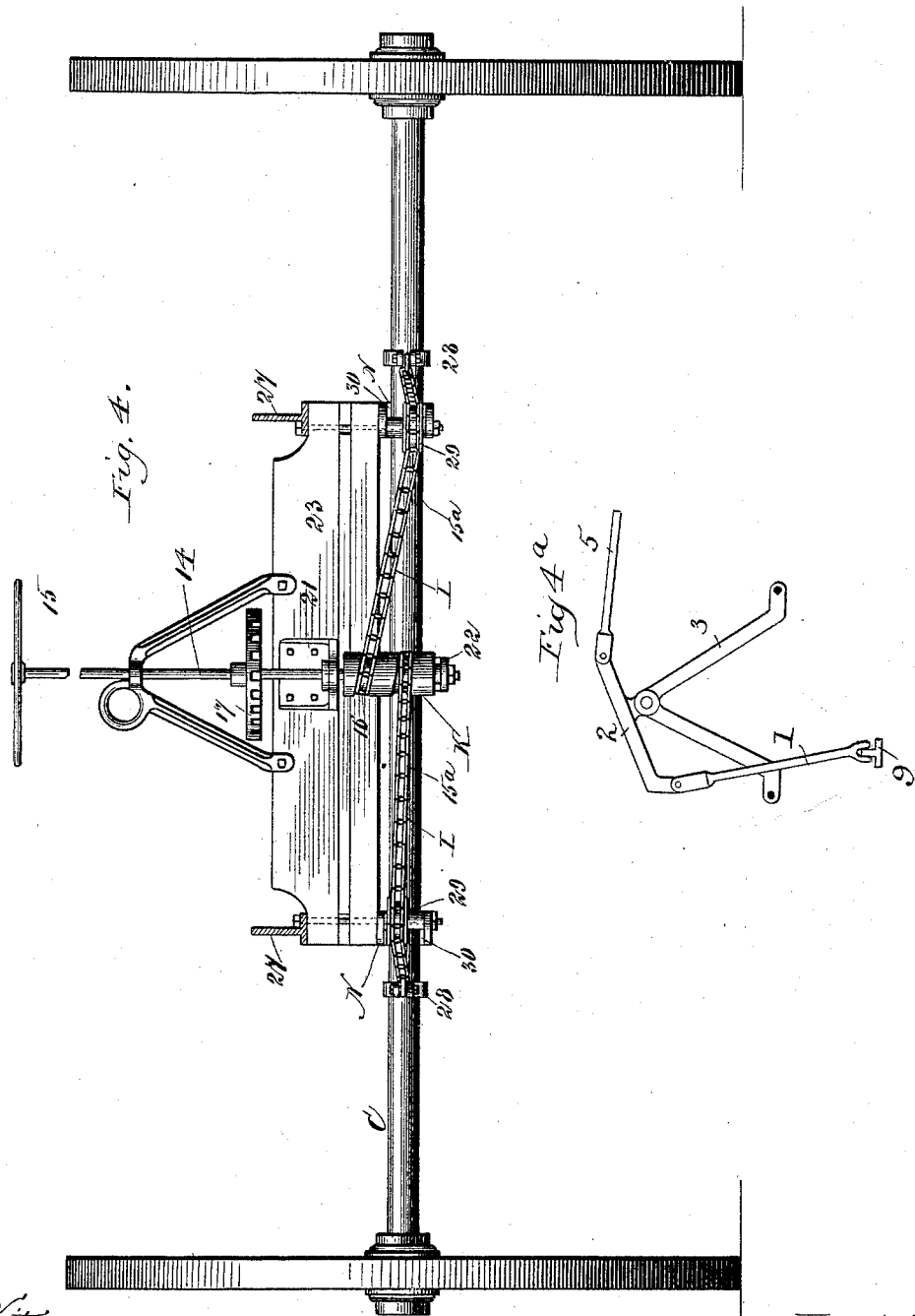

(No Model.)
M. G. BUNNELL.
MACHINE FOR MAKING AND REPAIRING ROADS.
No. 448,708. Patented Mar. 24, 1891.
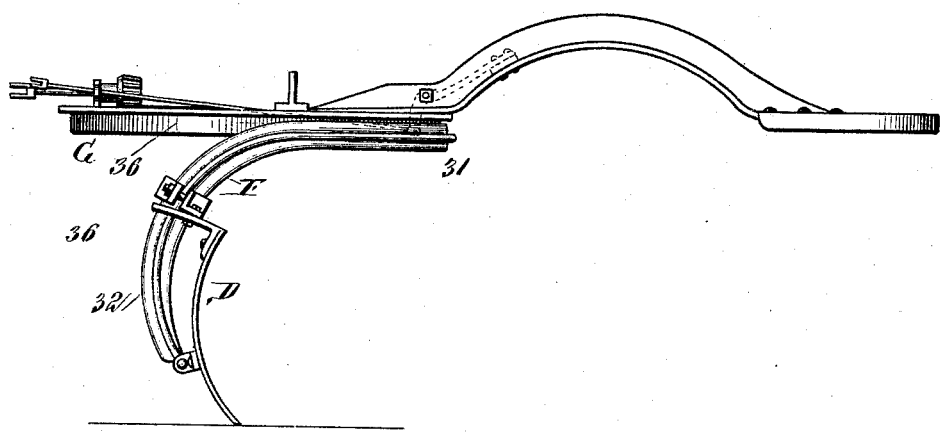
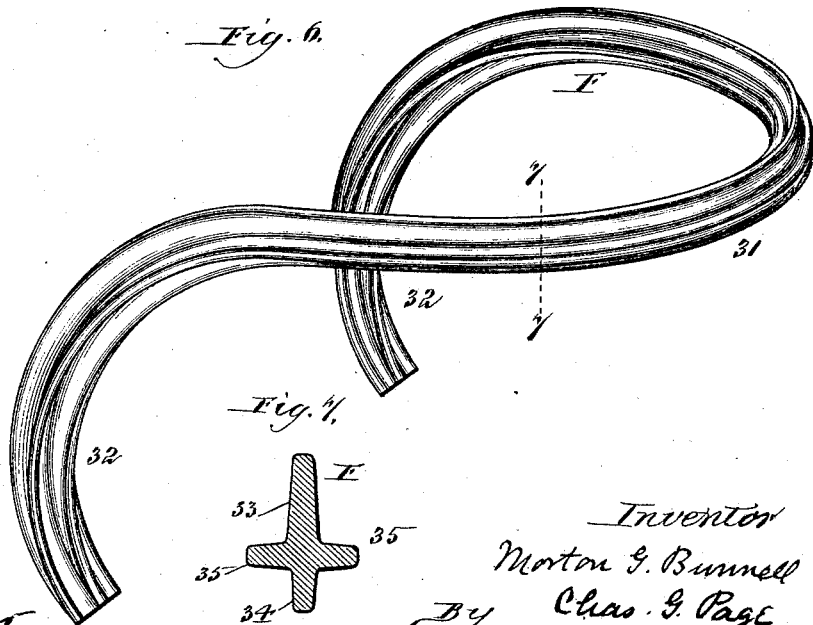
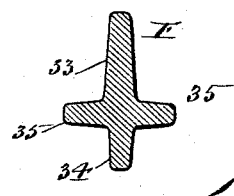
Witnesses
W. Rossiter
R. Wagner
Inventor
Morton G. Bunnell
By Chas. G. Page
Atty.

(No Model.)　　　　　　　　　　　　　　　　5 Sheets—Sheet 5.
M. G. BUNNELL.
MACHINE FOR MAKING AND REPAIRING ROADS.
No. 448,708.　　　　　　　　Patented Mar. 24, 1891.
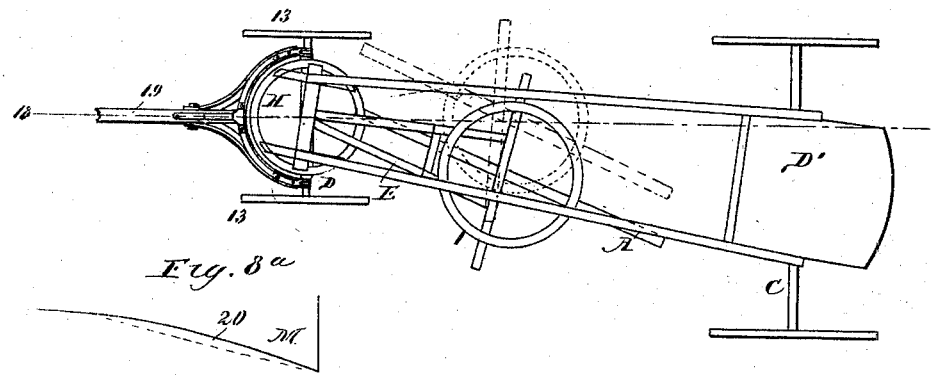
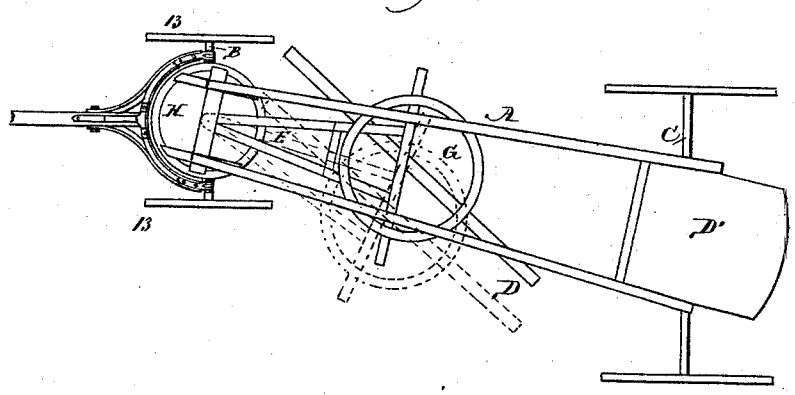
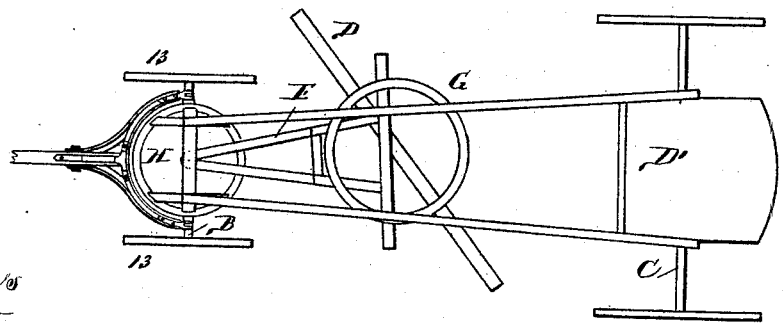

UNITED STATES PATENT OFFICE.

MORTON G. BUNNELL, OF CHICAGO, ILLINOIS, ASSIGNOR, BY MESNE ASSIGNMENTS, TO ANNA B. AUSTIN, OF SAME PLACE.

MACHINE FOR MAKING AND REPAIRING ROADS.

SPECIFICATION forming part of Letters Patent No. 448,708, dated March 24, 1891.

Application filed November 3, 1890. Serial No. 370,236. (No model.)

*To all whom it may concern:*

Be it known that I, MORTON G. BUNNELL, a citizen of the United States, residing at Chicago, in the county of Cook and State of Illinois, have invented a certain new and useful Improvement in Machines for Making and Repairing Roads, of which the following is a specification.

My invention relates to road-woking machines of the kind in which a diagonally-adjustable long scraper-blade is provided in connection with a four-wheeled carriage or body frame and arranged so that it can be swung horizontally about a point midway of its ends.

The more prominent objects and advantages of my invention are to permit either one of the rear wheels of a long rear axle to be brought toward or into alignment with one of the wheels of a short front axle, so as to permit the machine to run close up to a bank and at the same time provide for quick turning and the projection of the advance end of the scraper-blade outside of the track of one of the front wheels when so desired without objectionably increasing the length of the blade; to permit the wheels of a long rear axle to run in selected relations to a furrow or furrow-row; to permit either rear wheel to run either inside or outside of the track of the wheel ahead of it; to overcome all disposition on the part of the rear portion of the machine to slip sidewise by reason of such side draft as may be induced by the resistance of the soil to the obliquely-arranged scraper-blade and by a ready and easy adjustment of the rear axle with reference to the horizontal angle of the blade relatively to the line of progression permit the utilization of the side draft as a means for overcoming its tendency to swing the rear end of the machine to one side; to attain a wide range of side adjustment of the pivotal center, about which the blade can be swung horizontally, so as to permit the positioning of the blade for effectively plowing the various rounds essential to the ready and convenient formation of the road; to permit the blade to be set in a position most advantageous for hard plowing—as, for example, in clay or baked soil; to render it practical to take a furrow-row at the forward end of the blade and deliver the same at a suitable distance from the point at which it is taken, and at the same time allow the horses to walk at opposite sides of the furrow-row which is to be thus taken by the blade; to provide for a quick and ready side adjustment of the body-frame, so as to set the blade or the body, or both, over to one side or the other, as may be desired; to render the machine generally efficient for work, such as plowing, scraping, ditching, and hillside work, and to provide certain novel and improved features of construction, all serving to increase the general efficiency of machines for making and repairing roads.

To the attainment of the foregoing and other useful results my invention consists in matters hereinafter set forth.

In the accompanying drawings, Figure 1 is a top plan view of a machine for making and repairing roads embodying my invention. Fig. 2 is a top plan view of the rear portion of the machine on a scale somewhat larger than that of the preceding figure, portions of the axle being broken away for convenience of illustration. Fig. 3 is a section on dotted line 3 3 in Fig. 2. Fig. 4 represents in front end elevation the portion of the machine shown in Fig. 2, the axle being, however, unbroken. Fig. $4^a$ is a detached elevation of the devices for raising and lowering the scraper-blade. Fig. 5 represents in side elevation the draft-bar, circle, and segment to which the scraper-blade is attached. Fig. 6 represents the segment in perspective. Fig. 7 is a section on dotted line 7 7 in Fig. 6. Figs. 8, $8^a$, 9, and 10 are in the nature of diagrams illustrating in top plan so much of the machine as is necessary for indicating its several adjustments, as hereinafter set forth.

The body-frame A of the machine is pivotally supported upon a short front axle B and a long rear axle C. The diagonally-adjustable scraper-blade D is supported from the body-frame through the medium of raising and lowering devices, which can be of any suitable construction, and is carried below said body-frame and arranged to extend across the space between the front and rear wheels. The blade is also reversible—that is to say, it is pivotally held between its ends—so that it can be swung horizontally in both directions and thus permit its ends to be alternately placed ahead, it being understood that when in working position it is diagonal with relation to the line of progression of the machine.

The scraper-blade is arranged to extend across the width of the machine and is suspended below and from the body-frame by suitable raising and lowering devices, which can be operated by an attendant standing on the rear platform D. The raising and lowering devices herein selected consist each of a hanger 1, arranged to suspend the blade from an elevated vibratory lever 2, which is supported upon a standard 3 on the body-frame and operated by a hand-lever 4 and rod or link connection 5, as shown in Fig. 4ª.

While various other devices can be employed for raising and lowering the blade, it is understood that the construction of such and their connection with the blade must permit the latter to be moved bodily to either side of the machine. The scraper-blade thus suspended below the body-frame is drawn by a horizontally-swinging draft-bar E, which is pivotally held at the forward end of the machine, it being understood that the draft-bar can be loosely pivoted, so that while it can be swung horizontally in order to permit the scraper-blade to be set over toward one or the other side of the machine, according to requirements, it can also tilt in conformity with the rise and fall of the blade induced by the operation of either or both of the raising and lowering devices.

The blade may be pivotally connected at a point between its ends with the rear portion of the horizontally-swinging draft-bar in any suitable way, although, as a preferred arrangement, the blade is herein attached to the pendent arms of a segment F, which is secured to a circle or turn-table G, having at its center a pivotal connection with the horizontally-swinging draft-bar, and, as explanatory of means herein shown for turning said circle and swinging both the circle and draft-bar toward one and the other side of the machine, I may here briefly state that as a device for turning the circle so as to place either end of the blade ahead and also vary the horizontal angle of the same the circle carries a segment-gear 6, engaged by a pinion 7 on a hand-wheel shaft 8, and that as a device for swinging the blade bodily to one and the other side of the machine a cross-bar 9, secured upon the circle, is connected by a link 10 with a shifting-bar 11, which is arranged to slide in bearings on the main frame of the machine and operated by a lever 12.

The rear axle C is made longer than the front axle, and hence I will hereinafter refer to these said axles as the "long rear axle" and the "short front axle." The body-frame is at its forward end pivotally supported upon the short front axle by means of a turn-table or large fifth-wheel H, which prevents the body-frame from rocking, and thereby holds the forward end of the blade down to its work. The body-frame is at its rear end pivotally connected with the long rear axle between the ends of the latter. By pivoting or otherwise flexibly connecting the body-frame upon the front wheeled axle the latter may of course swing in turning the machine; but in addition to this function the pivotal connection between the body-frame and the front axle permits the body-frame to swing horizontally and independently of the front axle while the latter is at right angles to the line of draft and its wheels 13 are running straight ahead. In connection with the long rear axle and the body-frame I provide means whereby an operator standing upon the rear platform D' of the machine may swing said rear axle horizontally about its pivotal connection and in either direction. The long rear axle extends considerably beyond the sides of the machine and is capable of a swinging adjustment, as illustrated in Fig. 1, in which the long rear axle is illustrated in dotted lines as having been swung about its pivot, so as to place it for the time being oblique to the line of progression.

As one means whereby an attendant standing upon the rear platform D' may swing the rear axle either preparatory to or during the operation of the machine, I provide a simple, convenient, and effective device comprising a two-part chain I, attached at its rear ends to the rear axle adjacent to the ends thereof and having the forward ends of its two divisions attached to a winding drum or shaft K, formed with or secured upon the lower end of an upright hand-wheel shaft 14, carried by the body-frame of the machine and arranged so that the elevated hand-wheel 15 thereon shall be within convenient reach of an attendant standing upon the rear platform of the machine.

By attaching the chain to the axle at points near the wheels sufficient leverage is obtained to permit the operator to readily adjust the axle to any desired horizontal angle relative to the line of progression of the machine and to make such adjustment at any desired moment.

The chain I preferably comprises two sections 15ª and 15ª, so that the forward ends of the same can be secured to the winding drum or shaft K at points whereof one is above the other, and the winding drum or shaft is desirably provided with a worm or spiral groove 16, so as to prevent slip on the part of the chain-sections and insure proper winding and unwinding of the same. With the foregoing arrangement the rotation of the winding-shaft will cause one section or portion of the chain to wind thereon, while the other section or portion of the chain will unwind. For certain broader purposes of my invention I may use in place of the winding worm-shaft or drum K a sprocket and single length of chain, as in my application, Serial No. 363,273, for Letters Patent of the United States, or I may employ other devices embodied in several applications executed by me of even date herewith; but I prefer the device herein shown.

While I have herein provided as a matter of special improvement a particular construction of device adapted for locking the winding drum or shaft against rotation and consisting of a notched disk 17, fixed on the handwheel shaft, and a spring-controlled foot-latch L, pivotally supported upon the rear platform, I may for the broader purpose of my invention provide other constructions of devices for locking the winding drum or shaft or for otherwise locking the horizontally-swinging long rear axle in its various adjustments, and I may also provide, as hereinbefore mentioned, various devices for adjusting the horizontally-swinging long rear axle—such, for example, as those embodied in certain applications executed by me of even date herewith, it being observed, however, that in each instance I provide a long horizontally-swinging axle, which is adjustable to various angles relatively to the line of the body-frame.

For certain kinds of work it is desirable that the wheels at one side of the machine shall be brought toward or into alignment with one another, and thus permit one of the rear wheels to run in the track of the front wheel, which is directly ahead of it. It is also at times desirable to permit the pairs of front and rear wheels to run in other selected lines with reference to one another and to the road-bed, and also in connection with these adjustments of the wheels to set the scraper-blade over to one or the other side of the machine. It is also desirable to so control the blade that it may be of service in plowing, ditching, scraping, or moving earth, cutting down banks, and other like service. By supporting the body-frame upon a short horizontally-swinging front axle and an adjustable swinging long rear axle and adjustably connecting the scraper-blade at a point between its ends with a horizontally-swinging draft-bar under such arrangement that the blade shall as a whole stand in advance of the rear wheels to an extent to permit its free horizontal swing both ways I am enabled to attain all of the foregoing-stated desirable results, and by further providing means such as hereinbefore set forth for adjusting the axle an attendant standing on the rear platform can, during the progress of the machine, freely and rapidly shift the swinging rear axle to different horizontal angles relatively to the length of the body-frame, so as to cause various desirable relative changes in position between the rear and front wheels, and also various desirable changes in position on the part of the body-frame and scraper-blade. If, for example, the long rear axle has been adjusted about its pivotal connection with the body-frame so as to set it in the oblique position indicated in dotted lines in Fig. 1 the rear wheels will obviously have a tendency to run to one side of or oblique to the general line of progression of the machine. This tendency on the part of the rear wheels to run to one side will cause the body-frame to swing horizontally upon the short front axle until it has been brought into such oblique position relatively to the line of general progression of the machine as shall place the long rear axle again parallel with the short front axle. This is illustrated in Figs. 8 and 9, wherein the rear axle is understood to have been first adjusted oblique to the body-frame, it being observed that in Fig. 9 the body-frame has been swung to one side to a greater extent than in Fig. 8 by reason of a previous greater extent of swinging adjustment on the part of the rear axle. As a rule the adjustment of the rear axle is made in a way to primarily throw forward the rear wheel at the side of the machine whereat the advance end of the scraper-blade is positioned, and hence when the end of the scraper-blade shown to the rear in Figs. 8 and 9 is placed ahead the rear axle will generally be adjusted so as to swing the body frame to the right instead of to the left, as in said figures.

An important advantage involved in the foregoing is that the rear long axle can be adjusted so as to cause one of its wheels to be brought into alignment with the front wheel, which is directly ahead of it, as in Fig. 8. The said two wheels when thus brought into alignment may be run close up to a bank, so as to permit the blade to cut into the same or to permit said wheels to brace against a bank in plowing or ditching in soft slipping soil, and also when one rear wheel is thus brought into alignment with the wheel ahead of it the remaining rear wheel at the opposite side of the machine will be projected considerably outside of the track of the wheel ahead of it, and hence it can be made to run in selected relation to a previously-formed furrow or furrow-row.

With further reference to the relationship between the axles, body-frame, and scraper-blade, it will be noted that by providing the machine with a short front axle and pivoting the forward end of the body-frame thereon at a point midway of the ends of said axle the machine can be turned quickly and within the limited space usually afforded by a road-bed, and at the same time the advance end of the blade can be positioned, as in dotted lines, either just inside the track of one of the front wheels, as in dotted lines in Fig. 8, or to a desired extent outside of such track, as in Fig. 10, without objectionably increasing the length of the blade and without adjusting the blade to an extent to set it objectionably out or away from such oblique or diagonal position as it should occupy for the purpose of plowing into the soil or cutting into a bank at its forward end. The provision of a long rear axle is also desirable, first, to provide the machine with a base-support sufficiently broad to hold it steady and prevent it from tilting over when performing hillside work; second, to permit either rear wheel to be placed in alignment with the wheel directly ahead of it and at the same time provide in connection with the said short front axle the broad base aforesaid; third, to permit the desired extent of swinging adjustment on the part of the rear axle without undesirably narrowing or cutting away the body-frame or reducing the size of the rear wheels, and, finally, to permit certain desirable variations herein set forth in the relationship between the front and rear wheels and the blade and a wide range of adjustment on the part of the blade. The aforesaid adjustment on the part of the rear axle and consequent automatic adjustment of the body-frame also serves to shift the pivotal support for the scraper-blade to one side or the other, according to the way in which the rear axle is swung. This adjustment on the part of the body-frame, in connection with the horizontally-swinging draft-bar, permits the attainment of a wide range of service on the part of the machine. Thus if the rear axle is adjusted to about the position indicated in dotted lines in Fig. 1 the body-frame will, as a result of such adjustment, swing at its rear end to one side, and thereby shift to one side the pivotal center or point about which the scraper-blade can be swung. When, therefore, the rear axle has been adjusted so that the body-frame will be swung into position oblique to the line of progression, as in Fig. 8, the pivotal center of the blade (that is to say, the point midway of its ends, about which it can be swung horizontally) will be shifted to one side of the line 18, which represents a line running longitudinally and centrally through the machine, so as to pass through the pole 19 and the king-bolt, by which the fifth-wheel is pivotally held upon the front axle. By bringing the body-frame into said position, so as to shift the pivotal center of the blade to one side, the draft-bar can also be swung in the same direction and within the practical limit of its swinging adjustment, so as to multiply the extent of side shift of the pivotal center of the blade effected by the lateral swing of the body-frame, and hence the blade can be swung horizontally about its pivotal connection with the draft-bar, so as to place its advance end on the center line 18, as illustrated in full lines in Fig. 8, with the blade as a whole positioned oblique to but so near in parallel with said line as to adapt it for hard work, such as plowing in clay or hard-baked soil. The blade in said position will of course be set with its forward end suitably depressed, and when thus arranged it will cut into the earth at the middle line of forward draft and deposit the furrow-row between the rear wheels, whereof one is in alignment with the wheel ahead of it and both arranged relatively to the body-frame so as to overcome any and all side draft by reason of their disposition to run ahead.

For plowing the first round along the side portion of a road-bed the draft-bar can be swung from its position indicated in full lines in Fig. 8 to its position indicated in dotted lines in said figure, and unless the soil is too hard the scraper-blade can be turned about its pivoted connection with the draft-bar so as to place its advance end just inside or exactly in the track of one of the front wheels, it being observed that when the forward end of the blade is set as in dotted lines in Fig. 8 a light adjustment of the rear axle will permit one of its wheels to run in the furrow formed by the blade, or that by placing the forward end of the blade so as to cut in the track of the front wheel just ahead of it the said rear wheel may be placed in alignment with said front wheel, so as to run in the furrow. In either case, however, while one rear wheel will run in the furrow at one side of the road-bed, the other rear wheel will run in a line considerably toward the crest or middle line of the road-bed. For plowing what may be termed the "second round," so as to shear off the earth alongside the previously-formed furrow to a depth indicated by dotted line 20 in Fig. 8$^a$, the axle can be still further adjusted, so as to cause the rear end of the body-frame to swing still farther to one side, as in Fig. 9, and the draft-bar can be swung to one side within the practical limit of its swing, so that as a result of the combined lateral adjustment of the body-frame and draft-bar the scraper-blade may take the position indicated in said figure.

With the machine adjusted as in Fig. 9 the scraper-blade will be at a proper horizontal angle relative to the line of progression for performing the aforesaid work, and will also be in such position that while the horses may walk at opposite sides of the furrow-row left in making the first cut the blade may take the furrow-row at its forward end, which, it will be seen, is in line with the pole. By thus taking the furrow-row or loose earth a longer delivery can be attained than if the furrow-row should be taken by the blade toward its longitudinal center—that is to say, by taking the furrow-row at the advance end of the blade the loose earth forming the furrow-row can be left by the rear end of the blade at or near the crest or middle line of the road. It will also be seen that under the adjustment illustrated in Fig. 9 one of the rear wheels can run in such furrow-row as may be formed by the blade.

For cutting into a bank the machine can be brought into the adjustment illustrated in Fig. 10, wherein the scraper-blade is projected outside of the track of the front wheel, while one of the rear wheels is in position to run along the line of cut and thereby brace against or run close to the bank.

For plowing hard soil the draft-bar can be swung to one side as far as practicable, and also the body-frame can be caused to swing in the same direction, as aforesaid, and with this adjustment the blade can also be used for taking a furrow-row along the line 18, in which way the blade can take the loose earth at its forward end. In plowing comparatively hard soil I also find it frequently of great advantage to adjust the rear axle and body-frame as in Fig. 9 and set the blade as in full lines in Fig. 8. This said adjustment is also of value in moving earth.

With further reference to details of construction, the hand-wheel shaft 14 is supported by bearings 21 and 22. The bearing 21 is secured to a cross-bar 23, arranged along the forward edge portion of the rear platform D'. The bearing 22 consists of a bent plate or bar secured to the under side of the rear platform and extended forward, so as to provide a lower bearing for the hand-wheel shaft or winding-shaft on the lower end of the hand-wheel shaft. While the horizontally-swinging rear axle can be non-pivoted, as in certain applications executed by me of even date herewith, Serial Nos. 369,463, 369,464, 369,465, and 369,466, I prefer to pivotally connect it at a point midway of its ends with the body-frame, and as a matter of improvement I secure upon said axle a hub or collar 24, having upwardly and downwardly extending pivots or journals 25, respectively journaled in upper and lower bearings on the main frame of the machine. These said bearings are conveniently and effectively provided by a cross-bar 26, which is bolted to the sides 27 of the main or body frame as a cross-brace and by the aforesaid bearing 22.

The rear axle is at its end portions provided with clips or collars 28, to which the rear ends of chain I are attached, and at points in front of the rear axle the body-frame is provided with pulleys 29, about which the chain is arranged to pass, so that while the hand-wheel shaft can be arranged within reach of an attendant on the rear platform the chain may exert a nearly forward pull on one and the other ends of the rear axle, according to the direction in which the hand-wheel is turned. The arrangement of the hand-wheel shaft also renders it convenient for the attendant to operate the foot-latch L, which is arranged to engage a notched wheel or disk 17 on the hand-wheel shaft for the purpose of locking the latter.

The horizontally-swinging rear axle has its end portions extended through guide-bearings N, which are secured to the body-frame at opposite sides of the longitudinal center of said axle. These guide-bearings are conveniently bolted to the sides 27 of the body-frame and are each adapted to provide a horizontal guideway 30, adapted in height to the diameter of the axle and of a length proportional to the greatest desired extent of horizontal swing on the part of the portion of the axle which extends through it. These guide-bearings not only steady the axle and prevent its pivots 25 from being broken, but also prevent the rear portion of the body-frame from side rock and tilt independently of said axle, and hence cause the blade to be held steadily down to its work.

The segment F, which is secured to the circle, is formed of a single piece of iron rolled substantially +-shaped, as illustrated in Fig. 7, and bent as in Fig. 6. The upper part-circular portion 31 embraces a portion of the circle G, while its lower downwardly-bent end portions 32 form arms to which the scraper-blade is attached. This bar may be said to comprise the four flange portions 33 34 35 35. The wide flange portion 33 sets up against the perimeter 36 of the circle, while one of its narrower flange portions sets up against the lower edge of the circle, thereby providing a steady connection between said two members when they are bolted together. The form of the bar also gives it the strength necessary to withstand the enormous strain to which its arms 32 are subjected during the operation of the machine.

What I claim as my invention is—

1. The combination, substantially as and for the purpose hereinbefore set forth, in a machine for making and repairing roads, of a body-frame, a short horizontally-swinging front axle whereon the body-frame is pivotally held at a point midway of the ends of said axle, a diagonally-adjustable scraper-blade arranged below the body-frame so as to extend across the space between the front and rear wheels and pivotally held so that it can be swung to an extent to position its respective ends alternately ahead, and a long horizontally-swinging rear axle adjustable independently of the body-frame in its said movement about its longitudinal middle in both directions and to an extent to attain the hereinbefore-described relative adjustments between the rear and front wheels, body-frame, and scraper-blade.

2. The combination, substantially as hereinbefore set forth, in a machine for making and repairing roads, of a body-frame pivotally held upon a short horizontally-swinging axle, a draft-bar pivotally held at the forward end of the machine, a diagonally-adjustable scraper-blade pivotally held upon the laterally-swinging draft-bar, so as to extend across the space between the front and rear wheels and swing to an extent to position its respective ends alternately ahead, and a long horizontally-swinging rear axle adjustable independently of the body-frame in its said movement about its longitudinal middle in both directions and to an extent to attain the hereinbefore-described relative adjustments between the rear and front wheels, body-frame, draft-bar, and scraper-blade, for the purpose specified.

3. The combination, substantially as hereinbefore set forth, in machines for making and repairing roads, of a body-frame, a diagonally-adjustable scraper-blade arranged to extend across the space between the front and rear wheels, and front and rear swinging axles of unequal length, the body-frame being pivoted upon the front axle midway of the wheels thereon, and the rear axle being arranged to swing independently of the body-frame and in both directions, so that its ends can be alternately swung forward to an equal extent.

4. A road-scraper provided with a scraper-blade and means for setting and holding it in different inclined positions horizontally, with front and rear axles each centrally pivoted, the rear wheels having a greater spread than the front ones, substantially as set forth.

5. A road-scraper having a scraper-blade and means for reversing its horizontal position and devices for shifting it longitudinally, with front and rear swinging axles and means for changing their angles to the line of the body, substantially as set forth.

6. A road-scraper provided with a scraper-blade, with means for setting the blade horizontally in reverse inclined positions, devices for raising the ends thereof, and appliances for shifting it longitudinally, and with front and rear swinging axles, substantially as set forth.

7. The combination, with a road-scraper, of a diagonally-adjustable scraper-blade and devices for setting the same in reversely-inclined horizontal positions and for raising and lowering either end and for adjusting the same longitudinally, and front and rear swinging axles, the rear wheels having a greater spread than the front wheels, substantially as set forth.

8. A road-scraper provided with a diagonally-adjustable scraper-blade, and with devices for raising and lowering each end and for reversing the angle horizontally and for shifting the blade longitudinally, and with a pivoted rear axle, substantially as set forth.

9. A road-scraper provided with centrally-pivoted front and rear axles, the rear wheels having a greater spread than the front ones, and with a scraper-bar, with devices connected to the said bar to shift it to different positions horizontally and to different heights, substantially as set forth.

10. A road-scraper having a centrally-pivoted rear axle longer than the front axle and a vertically-adjustable and horizontally-reversible scraper-bar, substantially as set forth.

11. The combination, in a road-scraper, of a body, front and rear axles pivoted to the body, the rear axle being the longest, a vertically and diagonally adjustable and reversible scraper-bar, and appliances whereby the attendant may change the vertical and diagonal positions of the bar, substantially as described.

12. The combination, substantially as hereinbefore set forth, in a machine for making and repairing roads, of a body-frame pivotally held upon the front axle, a diagonally-adjustable scraper-blade carried below the body-frame and arranged to extend across the space between the front and rear wheels, a horizontally-swinging rear axle adjustable independently of the body-frame in its said movement about its longitudinal middle in both directions, and guide-bearings rigid with the body-frame and providing horizontal ways through which the end portions of the horizontally-swinging rear axle are extended, said guideways being proportional in length to the herein-described extent of swing in both directions on the part of said end portions of the rear axle, for the purpose specified.

13. The combination, substantially as hereinbefore set forth, in a machine for making and repairing roads, of a body-frame pivotally held at its forward end upon the front axle, a diagonally-adjustable scraper-blade carried below the body-frame and arranged to extend across the space between the rear wheels, a horizontally-swinging rear axle pivotally connected with the body-frame, a hand-wheel shaft supported upon the body-frame, and chain or like flexible connection between the hand-wheel shaft and the end portions of the horizontally-swinging rear axle.

14. The combination, substantially as hereinbefore set forth, in a machine for making and repairing roads, of a body-frame pivotally held upon the front axle, a diagonally-adjustable scraper-blade carried below the body-frame and arranged to extend across the space between the front and rear wheels, a horizontally-swinging rear axle pivotally connected with the body-frame, a hand-wheel shaft supported upon the body-frame, chain or like flexible connections between the hand-wheel shaft and the end portions of the horizontally-swinging rear axle, and guide rolls or pulleys for said chain connections supported upon the body-frame forward of the end portions of the rear axle.

15. The combination, substantially as hereinbefore set forth, in a machine for making and repairing roads, of the body-frame pivotally held upon the front axle, a diagonally-adjustable scraper-blade carried below the body-frame and arranged to extend across the space between the front and rear wheels, a horizontally-swinging rear axle pivotally connected with the body-frame, a hand-wheel shaft supported upon the body-frame, chain or like flexible connections between the hand-wheel shaft and the end portions of the rear axle, a notched wheel upon the hand-wheel shaft, and a foot-latch arranged for engaging said notched wheel.

16. The combination, in a four-wheeled road making and repairing machine provided with a diagonally-adjustable scraper-blade arranged to extend across the space between the front and rear wheels, of the horizontally-swinging long rear axle pivotally connected with the body-frame, a spirally-grooved winding drum or shaft K, supported upon the body-frame, and chain or like flexible connections between said winding drum or shaft and the end portions of the rear axle.

17. In a road-making and road-repairing machine comprising a wheeled body-frame and a diagonally-adjustable scraper-blade, the segment F, substantially +-shaped in cross-section, bent as described and formed of a single piece of continuous angle-iron, said segment being secured to the circle along its part-circular portion 31, and carrying the blade which is attached to its arms 32, substantially set forth.

MORTON G. BUNNELL.

Witnesses:
TH. C. KENNEDY,
CHAS. G. PAGE.